March 15, 1938. E. M. GARDNER 2,111,363
SPRING ASSEMBLING MECHANISM
Filed Jan. 8, 1937 5 Sheets-Sheet 1
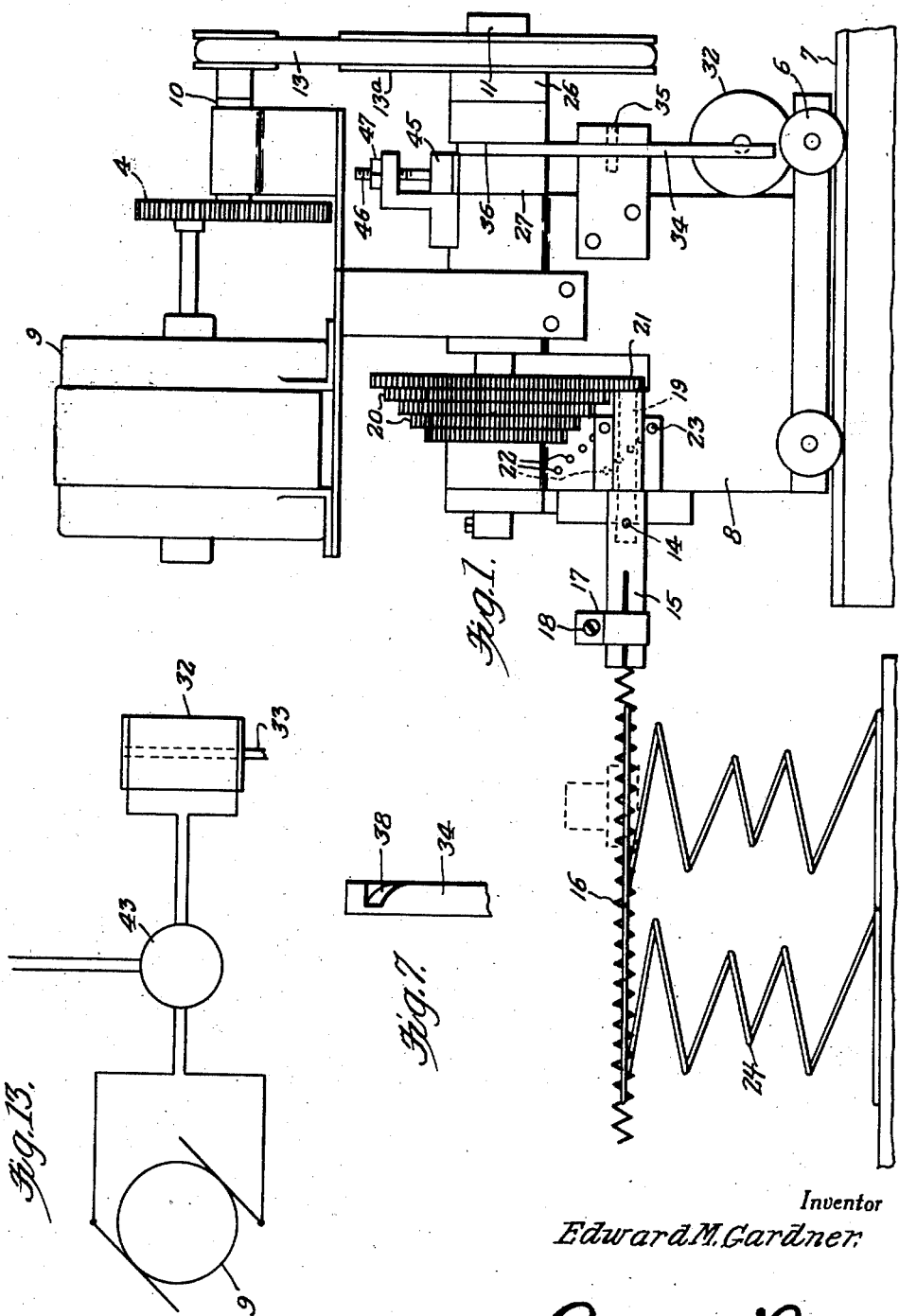
Inventor
Edward M. Gardner
By Clarence A. O'Brien
Hyman Berman
Attorneys March 15, 1938.  E. M. GARDNER  2,111,363
SPRING ASSEMBLING MECHANISM
Filed Jan. 8, 1937   5 Sheets-Sheet 2
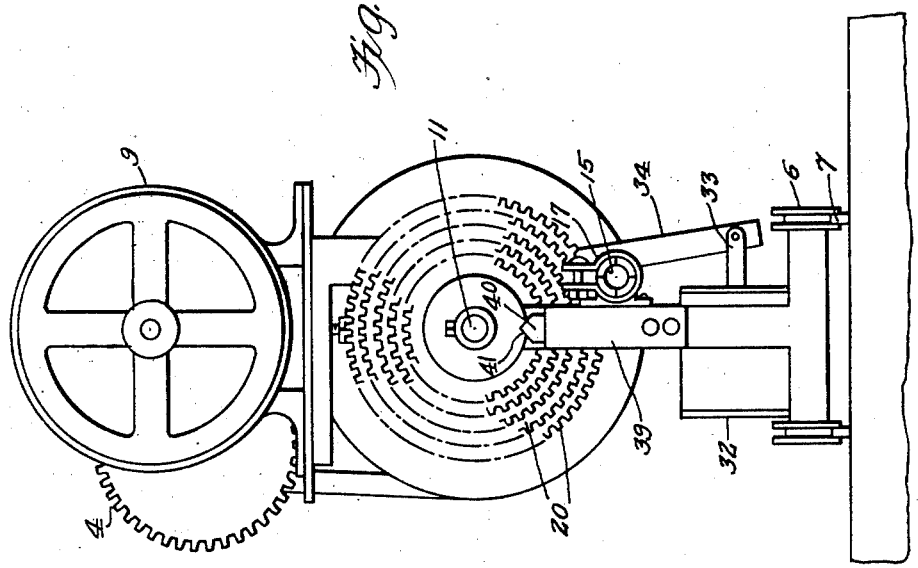
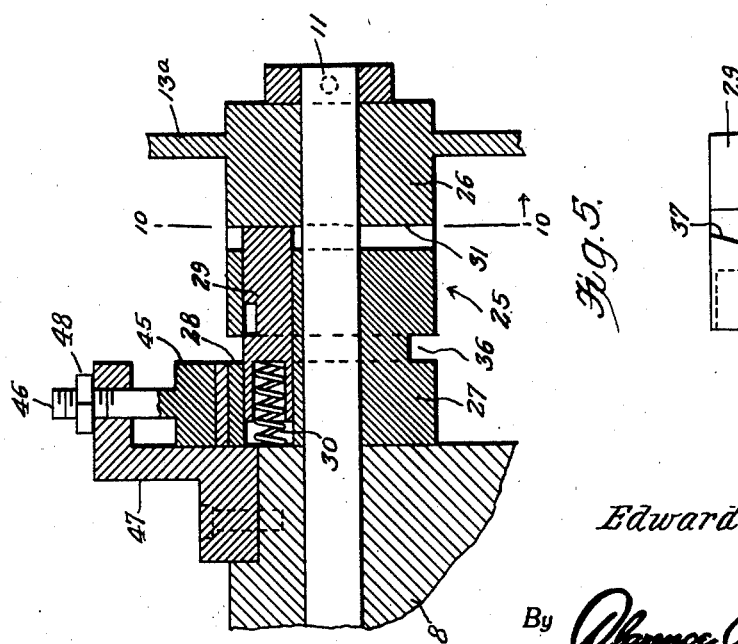
Inventor
*Edward M. Gardner*
By *Clarence A. O'Brien*
*Hyman Berman*
Attorneys March 15, 1938.  E. M. GARDNER  2,111,363
SPRING ASSEMBLING MECHANISM
Filed Jan. 8, 1937  5 Sheets-Sheet 3
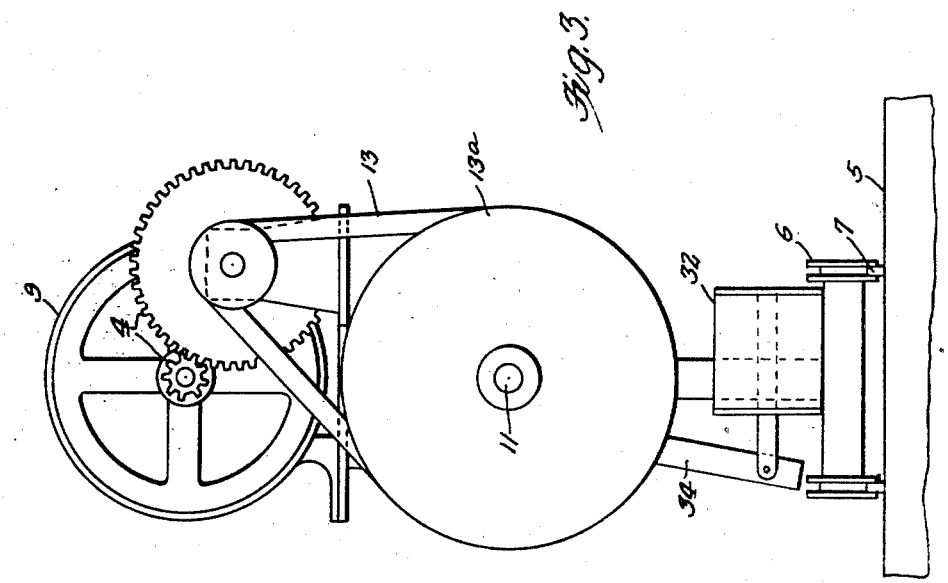
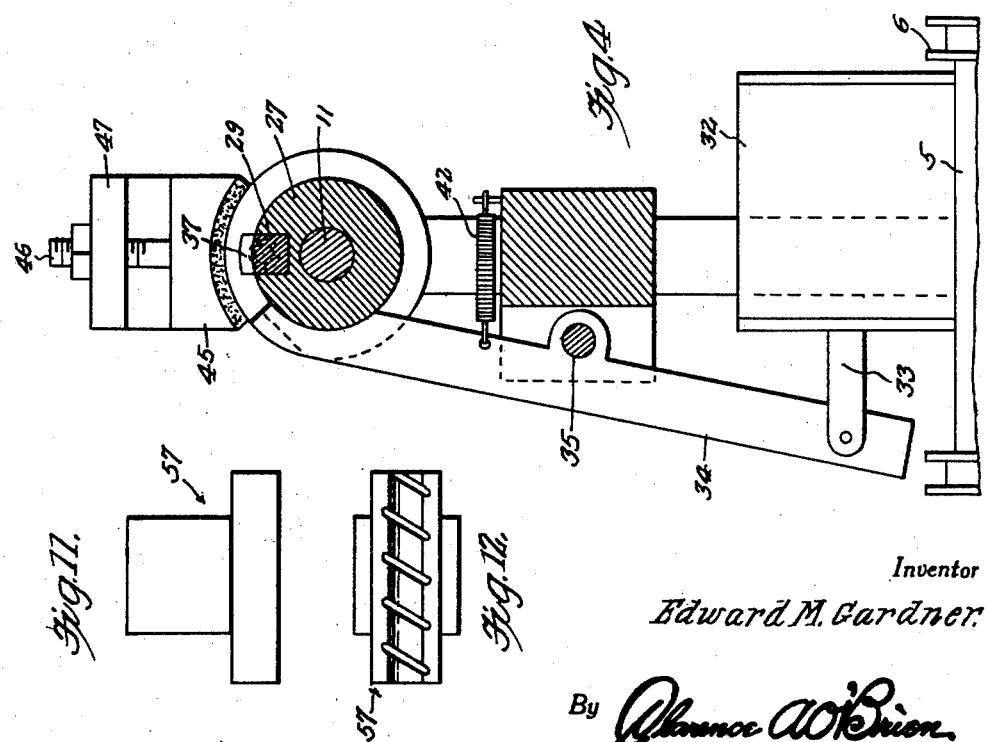
Inventor
*Edward M. Gardner.*
By *Clarence A. O'Brien*
*Hyman Berman*
Attorneys March 15, 1938.   E. M. GARDNER   2,111,363
SPRING ASSEMBLING MECHANISM
Filed Jan. 8, 1937   5 Sheets-Sheet 4

Inventor
Edward M. Gardner.
By Clarence A. O'Brien
Hyman Berman
Attorneys

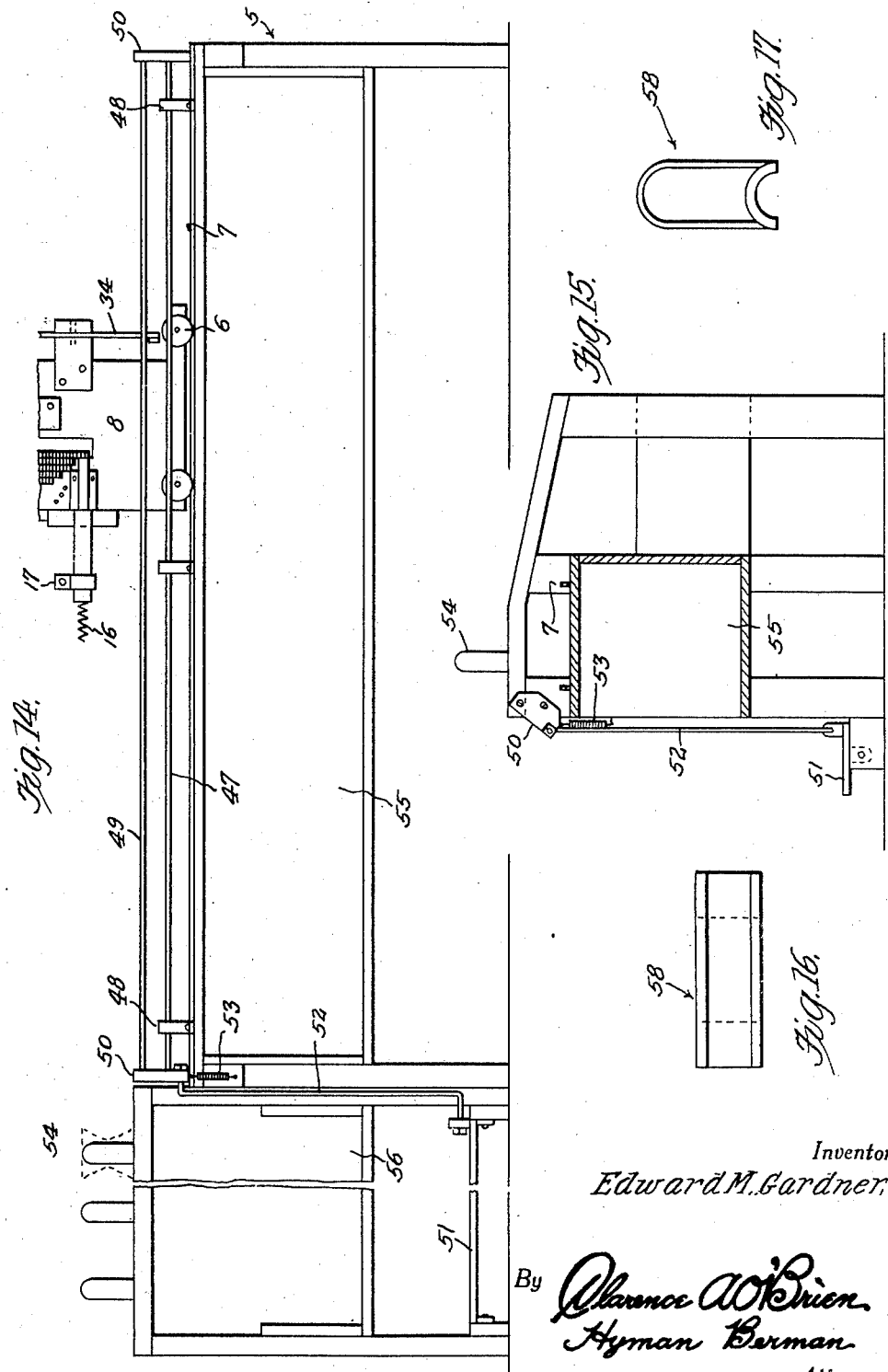

Patented Mar. 15, 1938

2,111,363

UNITED STATES PATENT OFFICE 2,111,363

SPRING ASSEMBLING MECHANISM

Edward M. Gardner, Cicero, Ill.

Application January 8, 1937, Serial No. 119,707

5 Claims. (Cl. 140—3)

This invention relates to mechanism for assembling spiral springs, such as upholstery springs, cushion springs or the like, and an object of the invention is to provide a mechanism whereby such springs may be quickly connected together through the medium of helical connector-springs.

The invention together with its objects and advantages will be best understood from a study of the following description taken in connection with the accompanying drawings wherein:—

Figure 1 is a side elevational view of a spring assembling mechanism embodying the features of the present invention.

Figure 2 is a front elevational view of the mechanism.

Figure 3 is a rear elevational view of the mechanism.

Figure 4 is a vertical sectional view through a rear portion of the mechanism.

Figure 5 is an enlarged fragmentary detail sectional view through a clutch and brake assembly.

Figure 6 is a plan view of a slide forming part of the clutch mechanism.

Figure 7 is a fragmentary edge elevational view of a clutch control lever.

Figure 11 is a side elevational view of a finger form guide block.

Figure 12 is a bottom plan view of the finger form guide block.

Figure 13 is a wiring diagram showing a solenoid, electric motor and automatic control means for the motor and solenoid.

Figure 14 is a side elevational view of a slightly modified form of the invention.

Figure 15 is a transverse sectional view through the supporting table adjacent one end of the latter.

Figure 16 is a bottom plan view of a slightly modified form of finger form guide block.

Figure 17 is an end elevational view of the second form of finger form guide block.

Figure 8:
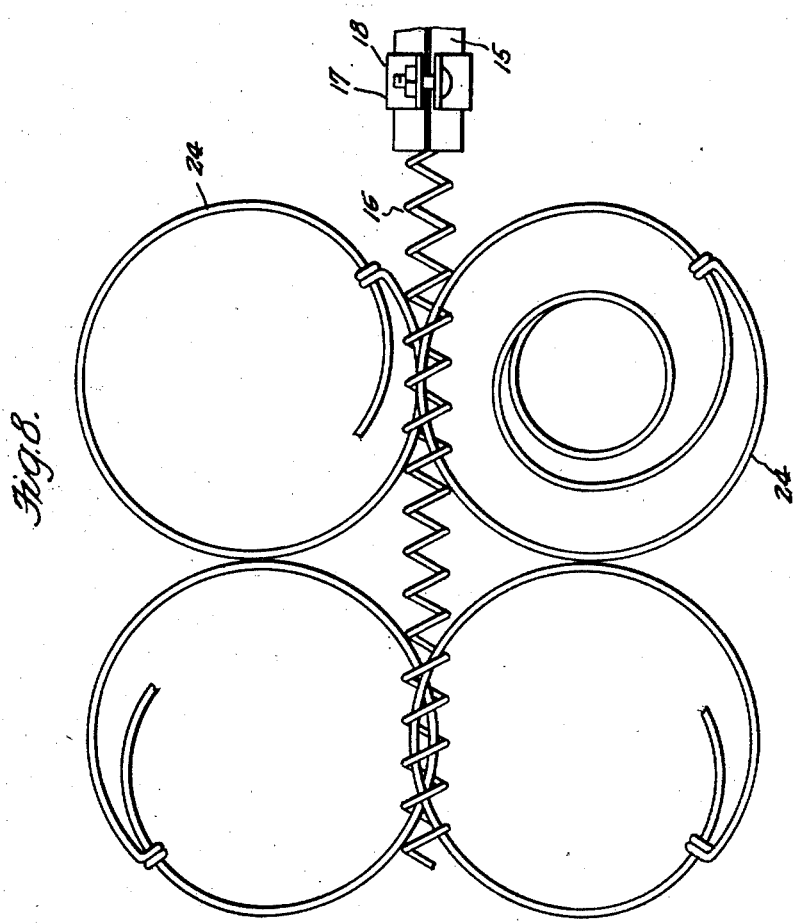
Figure 8 is a plan view showing the manner of connecting cushion or upholstery springs together through the medium of a helical connector-spring.

Referring to the drawings more in detail, it will be seen that the preferred embodiment of the invention the improved spring assembling mechanism includes a suitable supporting structure such as a table or the like 5 on which is mounted a track consisting of parallel rails 7 which may be in the form of strips of metal or the like. A carriage 8 equipped with wheels 6 is used to carry the mechanism upon the rails 7. Suitably supported on the carriage is an electric motor 9. Also suitably supported on the carriage is a shaft 10 driven from the motor 9 through the medium of gearing 4. Also suitably mounted on the carriage is a rotatable driving shaft 11 which is driven from the shaft 10 through a suitable belt and pulley drive mechanism 13. Journaled in a bearing member 19, mounted on the carriage 8 in a manner hereinafter more fully explained is a drive shaft 12.

Figures 9, 10:
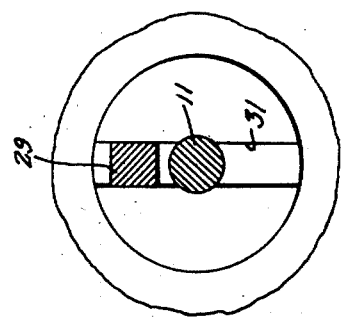
Figure 9 is a fragmentary sectional view of a rotatable driving arm.
Figure 10 is a detail sectional view taken substantially on the line 10—10 of Figure 5.

At its forward end the driving shaft 12 has sleeved thereon and secured thereto through the medium of a set screw 14 (and as best shown in Figure 9), a tubular driving arm 15 that is adapted to receive the end of a helical connector-spring 16. The forward end of the driving arm 15 is split and is adapted to grip the end of the connector-spring when contracted by the tightening of the split clamping band 17 that embraces the forward end of the driving arm; the tightening of the band 17 about the arm 15 being accomplished through the medium of bolt and nut means 18 which connects the ends of the split band.

On the forward end of shaft 11 is a plurality of graduated gear wheels 20, while on the rear end of the driving shaft 12 is a gear wheel 21 adapted to mesh with a selected one of the gears 20 for imparting to the shaft 12 a predetermined number of turns dependent upon the spacing between respective pairs of springs 24. To this end carriage 8 is suitably provided with two parallel diagonal rows of openings 22 for receiving bolts or the like 23 associated with the bearing 19 whereby the bearing 19 may be mounted at the desired position of vertical adjustment on the carriage to engage the gear 21 with the selected gear 20. Thus it will be seen that the shaft 12 may be driven to turn 8, 9, 10 or any other predetermined number of revolutions as determined by the engagement of the gear 21 with a selected gear 20.

When the connector-spring 16 has advanced the distance between two successive pairs of springs 24 shaft 12 will have completed the proper number of revolutions, and upon completing this predetermined number of revolutions shaft 12 will cease to rotate by reason of the fact that drive from the motor 9 to the shaft 11 will be automatically interrupted through the medium of a clutch mechanism indicated generally by the reference numeral 25.

The clutch mechanism 25 as best shown in Figure 5 includes a clutch element 26 forming an integral part of the hub of pulley 13a which is loose on the shaft 11 and a clutch member 27 which is suitably fixed on the shaft 11 to rotate with the shaft. The clutch member 27 is provided with an opening 28 therethrough in which a block 29 has a sliding fit and is provided at one end to accommodate a spring 30 which acts on the slide 29 to urge the same in one direction for the purpose of engaging the free end of the slide with a slot 31 provided in one face of the clutch element 26 whereby said clutch elements are engaged for transmitting drive from the pulley 13a to the shaft 11.

There is provided a solenoid 32 suitably mounted on the carriage and the core 33 of the solenoid is pivotally connected at one end to one end of a lever 34.

The lever 34 intermediate its end is pivotally mounted as at 35 on the carriage and has a free end adapted to engage in a peripheral groove 36 provided in the clutch member 27.

The slide 29 at one side thereof is provided with a cam slot 36 while the free end of the lever 34 is provided with a complemental cam slot 38 (see Figure 7) which, with the free end of the lever 34 engaging in the groove 36 will cooperate with the cam slot 37 for retracting the slide 29 for disengaging the clutch elements 26, 27 and thus interrupt the drive from the pulley 13a to the shaft 11 so that the driving shaft 12 being driven through the medium of the gearing 20, 21 from the shaft 11 will cease to rotate.

In order to insure a substantially instant stopping of the shaft 11, and the shaft 12 immediately upon the disengaging of the clutch elements 26, 27 in the manner just described there is provided at the front of the carriage and mounted in a suitable guide 39 a spring projected plunger 40 which has a pointed end adapted to engage a notch 41 in the periphery of the shaft 11 at the forward end of the latter to arrest further rotation of the shaft 11 upon disengagement of the clutch elements 26, 27, it being understood that the plunger 40 will offer little or no resistance to the shaft 11 while the latter is being positively driven from the pulley 13a.

The cam equipped end of the lever 34 is urged toward the clutch element 27 through the medium of a suitably provided spring 42.

The solenoid 32 is arranged in circuit with an automatic controller 43 that is electrically operable and which will be set to open or interrupt the circuit through the solenoid 32 at a predetermined time, which will be at about the time the connector spring has advanced the distance between two successive pairs of coil springs 24 so that lever 34, after the shaft 12 has completed its predetermined number of revolutions, will be free to act in response to spring 42, spring 42 acting to draw the free end of the lever 34 into the groove 36 so that the cam groove 38 of the lever will coact with the cam slot or groove 37 in the slide 29 to retract the slide for disengaging the clutch elements 26 and 27 to interrupt the drive to the shaft 12. In this connection it will be understood that normally the solenoid 32 is energized so that the core thereof will be held in retracted position thereby retaining the free end of the lever 34 normally out of engagement with the groove 36 of the clutch member 27.

For steadying the clutch there is provided a brake member 45 on one end of a threaded bolt 46 that works through one arm of an angular bracket 47 suitably mounted on the carriage 6 as shown in Figure 5. The brake 45 is held at the desired adjustment through the medium of a lock nut 48 and is arranged to frictionally engage the periphery of the clutch element 47 for steadying the latter.

In the form of the invention shown in Figure 14 instead of using a solenoid control for the lever 34 the solenoid may be dispensed with and in its place a manual control for the lever 34 provided. As shown in Figures 14 and 15, the manual control consists of a rod 47 rotatably supported at one side of the table 5 through the medium of brackets 48.

Paralleling the rod 47 is a trip rod 49 and rods 47 and 49 are connected at their ends through the medium of plates or the like 50.

At one side of the table 5 and adjacent one end of the table there is suitably mounted a pivoted foot pedal 51 that is connected with one of the plates 50 through medium of a link 52. Also secured to said one plate 50 is one end of a spring 53 the other end of which is suitably anchored to the table. Spring 53 normally urges the rods 47 and 49 to rotate in a counter-clockwise direction.

When using this type of control for the clutch lever 34 it will be seen that the operator presses downwardly on the pedal 51 so that trip rod 49 trips the clutch lever 34 to permit slide 29 to engage the clutch so that drive will be transmitted to the shaft 12 for turning the same the selected number of times. Upon engagement of the clutch in this manner the operator releases lever 51 freeing the lever 34 which returns to original position in response to spring 42. As the carriage moves along, shaft 11 completes its predetermined number of revolutions when lever 34 then cooperates with slide 29 for disengaging the clutch so that the fly-wheel 26 will run loose on shaft 11 thus interrupting the drive to the shaft 12.

For engaging the springs 24 that are to be assembled and connected through the medium of the coil springs 16 there are provided on the table 5 at one end thereof posts or pegs 54.

Also, as clearly shown in Figures 14 and 15 the table 5 is provided with a compartment 55 for storing the connector-springs, and also with a compartment 56 that may be used for storing the springs 24.

For positively guiding the connector spring 16 as it is being turned for connecting springs 24 resort is had to a finger guide form or block of any suitable type, as for example the type shown in Figures 11 and 12 and indicated by the reference numeral 57, or the type shown in Figures 16 and 17 and indicated by the reference numeral 58.

In the operation of the apparatus the operator engages one end of the connector spring 16 with the continuous portions of a forwardmost pair of springs 24, while the other end of the connector spring 16 is engaged in the manner hereinbefore described in detail with the driving arm or shaft 15.

In this connection it will be understood that the driving arm or shaft 15 will be placed at the desired position of vertical adjustment so that the gear 21 will be placed in mesh with the proper gear 20 dependent upon the number of turns that is to be imparted to the shaft 12, and which number of turns, as previously explained will depend upon the spacing between successive pairs of springs 24. The device is then set in operation and drive is transmitted from the motor to the shaft pin and from the shaft pin to the shaft 11 and from the shaft 11 to the driving shaft 12 which latter turns the helical connector-spring 16 the desired number of revolutions for advancing the spring 16 and weaving the same about the portions of the springs 24 of two adjacent parallel rows of springs. When the connector-spring has advanced the predetermined amount controller 43 goes into operation for de-energizing the solenoid 32 for releasing the clutch lever 34. The clutch lever 34 then swings into engagement with the slide 29 to retract the same for disengaging the clutch for interrupting the drive from the shaft 10 to the shaft 11. The controller will be set to maintain the solenoid 32 de-energized for a predetermined period of time after which the controller will operate to energize the solenoid 32 so that the latter will operate to swing the clutch lever 34 in opposition to spring 42 thus permitting slide 29 to move to normal position for engaging the clutch whereupon drive from the shaft 10 to the shaft 11 will be resumed for again turning the shaft 12 the predetermined number of revolutions so that spring 16 will be advanced sufficiently for connecting together the spring of the next pair of opposed springs 24. Thus the connector spring 16 will be advanced in this step by step manner until all the springs 24 of two parallel rows of springs are connected together in pairs.

Substantially the same operation and result is obtained where the manual control 51 is resorted to for the clutch lever 34. Accordingly, a detailed description of the operation of this modified form of the invention is deemed unnecessary.

It is thought that a clear understanding of the construction, utility and advantages of an invention of this character will be had without a more detailed description.

Having thus described the invention what is claimed as new is:—

1. An apparatus for connecting springs by weaving helical connector wires through said springs, comprising a track, a carriage movable along the track, a motor mounted on said carriage, a shaft journaled on said carriage, means connecting said motor to said shaft for driving the latter and including clutch means for placing the shaft into and out of driving engagement with said motor, a driving shaft journaled on said carriage, means for supporting said driving shaft on the carriage at a desired position of vertical adjustment, a plurality of graduated gears on the first-mentioned shaft and a gear on the driving shaft adapted to be engaged with a selected one of the first-mentioned gears, and a driving arm on the driving shaft for connecting a helical connector wire with the driving shaft.

2. A device for assembling springs by weaving helical connector wires through said springs, said device including a supporting means, a motor mounted on said supporting means, a shaft journaled on said supporting means, means connecting said motor with said shaft for driving the latter including a clutch device, for placing the shaft into and out of driving engagement with said motor, a plurality of graduated gears on said shaft, a bearing mounted on said supporting means, means for supporting said bearing at a desired position of vertical adjustment on said supporting means parallel to said shaft, a driving shaft journaled in said bearing and provided on one end with a gear to engage a selected one of the first mentioned gears for transmitting drive from said shaft to the driving shaft, mechanism for disengaging said clutch, including a solenoid, an electrical circuit including said motor and said solenoid and automatically operable control means arranged in the circuit with solenoid for simultaneously interrupting the circuit through solenoid whereby said clutch will be released incidental to the interruption of the circuit through the motor.

3. A device for assembling springs by weaving helical connector wires through said springs, said device including a supporting means, a motor mounted on said supporting means, a shaft journaled on said supporting means, means connecting said motor with said shaft for driving the latter including a clutch device for placing the shaft into and out of driving engagement with said motor, a plurality of graduated gears on said shaft, a bearing mounted on said supporting means, means for supporting said bearing at a desired position of vertical adjustment on said supporting means parallel to said shaft, a driving shaft journaled in said bearing and provided on one end with a gear to engage a selected one of the first-mentioned gears for transmitting drive from said shaft to the driving shaft, mechanism for disengaging said clutch, including a pivotally mounted clutch control lever, means normally urging said lever into engagement with the clutch for releasing it, and manually operated means for releasably retaining said lever out of engagement with the clutch.

4. A device for assembling springs by weaving helical connector-wires through said springs, said device including a driving arm with which one end of the connector wire is connected for weaving the connecting wire to the springs to be assembled, and mechanism connected with said driving arm for advancing the connector wire step by step, the number of turns being imparted to the connector wire in each step of its advancement being determined by the spacing of the springs to be assembled.

5. A device for assembling springs by weaving helical connector-wires through said springs, said device including a driving arm to which the connector-wire is secured at one end to be advanced step by step by the turning movement of the driving arm, driving mechanism connected with said arm for turning the latter to weave the connector wire through the springs step by step, said driving means including clutch means for automatically interrupting the drive to the driving arm at the completion of a predetermined number of turns of said driving arm and for subsequently resuming the drive connection after a predetermined interval.

EDWARD M. GARDNER.